United States Patent Office 3,388,097
Patented June 11, 1968

3,388,097
POLYESTERS FROM PERHALOALKYL BIS-
PHENOLS AND SPECIFIED AROMATIC
ACID HALIDES
Francis Bernard Cramer, Newark, Del., assignor to E. I.
du Pont de Nemours and Company, Wilmington, Del.,
a corporation of Delaware
No Drawing. Filed May 15, 1964, Ser. No. 367,874
7 Claims. (Cl. 260—47)

ABSTRACT OF THE DISCLOSURE

Aromatic polyesters from perhaloalkyl bisphenols and specified aromatic acid halides can be employed for the production of light-stable shaped articles and particularly filamentary structures which exhibit a high degree of wash-set recoverability and resistance to soiling.

---

Among the large number of synthetic linear condensation polymers, certain polyamides and polyesters have received a notable degree of commercial acceptance. In particular, the polyesters have made possible the first approach to fabrics which are wash-wearable, i.e., fabrics which ideally resist mussing and wrinkling in use and which can be laundered and then worn without ironing. Fabrics composed of poly(ethylene terephthalate) filaments and blends thereof with cotton, have been widely utilized in shirts, blouses, and the like, where the ease-of-care properties (as compared with fabrics composed entirely of natural fibers) have found great popular appeal. In order to enlarge wash-wear advantages and improve wash-wear performance in existing end-uses and proposed other applications, a continuing search is in progress for new polymers which possess the structural attributes necessary to superior properties. A prime test for wash-wearability is the wash-set recovery test which can be performed on strands of yarn composed of the polymer undergoing screening.

This invention provides polyesters for the production of filaments exhibiting a high degree of light stability, wash-set recovery, and resistance to soiling. These accomplishments, as well as others, will become apparent from the specification and claims which follow.

The achievements of this invention are accomplished by providing aromatic polyesters consisting essentially of the recurring structural unit

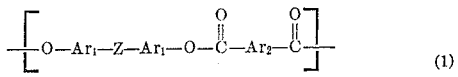

(1)

wherein Ar$_1$ is para-phenylene, each unit of which may bear one or more substituents selected from the group consisting of halogen and monovalent lower alkyl; Ar$_2$ is a radical selected from the group consisting of (1) meta-phenylene, (2) mixtures of meta-phenylene with up to 90% of para-phenylene radicals, each unit of which may bear one or more substitutents selected from the group consisting of halogen and monovalent lower alkyl and (3)

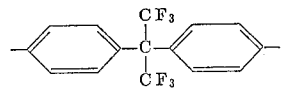

and Z is a divalent radical having the formula:

wherein R and R' may be the same or different, and represent perhalogenated lower alkyl groups, fluorine and chlorine being the preferred halogen species, with the provision that R' may represent hydrogen when R represents a perfluorinated lower alkyl group, or R and R' may, together with the carbon atoms to which they are attached, constitute a perfluorinated cyclic hydrocarbon group. The perhalogenated lower alkyl and cyclic hydrocarbon groups referred to above contain a total of no more than about 6 carbon atoms. Small amounts, up to about 10% by weight, of units not conforming to the formula may be present in the polymer chain.

The polymers of this invention characteristically are high molecular weight, fiber-forming materials which have excellent stability to light and which can be processed into filamentary structures which have excellent wash-wear potential and possess a high degree of anti-soiling character. Single filaments or yarns comprising the polymers of this invention exhibit wash-set recovery angles in excess of at least about 300 degrees and usually in excess of 320 degrees. Fabrics prepared from the polymers of this invention display a recovery from soiling (both oily and dry) which is superior to that shown by fabrics containing poly(ethylene terephthalate) filaments, when measured under the soiling condition later described in Example XXXVI.

Most conveniently, the instant polymers may be prepared from nearly equimolar amounts of the appropriate bisphenol and aromatic diacyl halide by interfacial polymerization. Especially high-molecular weight polymers are obtained when the reaction is carried out in the presence of a quaternary ammonium compound such as, for example, tetraethylammonium chloride. In accordance with the usual interfacial polymerization procedure, the reactants are present in different liquid phases which are immiscible and which, in the preparation of the present polymers, constitute two solvent media. Thus, the bisphenol is dissolved in one solvent medium, the aromatic diacyl halide is dissolved in a second solvent medium immiscible with the first, and the solutions are rapidly combined with vigorous agitation. Normally, an alkaline aqueous medium serves as the solvent for the bisphenol, and an organic solvent is utilized for the aromatic diacyl halide, said organic solvent being so chosen that it exerts a solvating effect on the polymer produced, either dissolving it completely or serving as a swelling medium.

The polymers of this invention may also be prepared from nearly equimolar amounts of the appropriate bisphenol and aromatic diacyl halide by solution polymerization in the presence of a suitable catalyst or acid acceptor. In accordance with the normal procedure where solution techniques are employed, the reactants are present in a common solvent which also serves as a solvent for the polymer under the conditions of condensation. Thus, the bisphenol and the diacid halide are dissolved in separate portions of the solvent chosen, the catalyst or acid acceptor is added, and the solutions are combined with agitation. The hydrogen halide which is evolved as a by-product of the condensation reaction may be effectively removed by the use of an acid acceptor as a tertiary amine, for which purpose an amine which has a high base strength is required. Suitable tertiary amines have pk$_A$ values of at least about 9, when measured in water at 25° C. Where higher temperatures are utilized, the hydrogen halide may be spontaneously volatilized.

Solution polymerization may be effected at temperatures ranging from 0° C. to 185° C. or above. When in this low-temperature procedure, an acid acceptor is employed, it serves as a satisfactory catalyst. Catalysts of the type employed in interfacial polymerization are effective when higher temperatures are employed. By the use of such catalytic agents, condensations may be effected even with bisphenols which have hitherto been non-reactive under condensation polymerization conditions. Where high temperatures are employed, it is frequently possible to utilize the reflux temperature of the solvent chosen as a satisfactory temperature for condensation. It will be noted that the polymers of this invention are prepared by the condensation of bisphenols with diacid halides. The use of the latter is important, inasmuch as the "direct" preparation of the polymers from bisphenols and free acids normally is not possible. The polymer-forming reaction may be carried out in a continuous manner, by which the reactants are continuously introduced to the reaction zone and the polymeric product is continuously prepared and withdrawn. Polymerization may also be accomplished in a batch process in which equimolar amounts of the reactants are initially introduced to a reaction vessel, the condensation polymerization is effected, and the product is isolated.

The bisphenols which are useful in the preparation of the instant polymers have the structure:

$$\text{Ho}-\text{Ar}_1-\text{Z}-\text{Ar}_1-\text{OH} \quad (2)$$

wherein $Ar_1$ and $Z$ have the same significance as set forth hereinbefore. The bisphenols of this structure may be prepared by the acid catalyzed condensation of an appropriate halogenated ketone or aldehyde with two molecules of an appropriate phenol by a procedure similar to that of, for example, U.S. Patent 2,435,014 wherein the sulfuric acid catalyzed condensation of hexachloroacetone and diisobutylphenol is described, or by the method of Knunyants et al. (Bull. Acad. Sci. U.S.S.R., Div. of Chem. Sci., 1960, 647–653; English edition) in which phenol and a fluoroketone are condensed in the presence of anhydrous hydrogen fluoride.

Preferred among the bisphenols which are useful in the practice of this invention are 4,4'-(hexafluoroisopropylidene) diphenol, 4,4'-(chloropentafluoroisopropylidene) diphenol, 4,4' - (sym - dichlorotetrafluoroisopropylidene) diphenol, and 4,4'-(hexafluorocyclobutylidene)diphenol.

The preferred difunctional acid halides which are employed in the preparation of the instant polyesters have the structure:

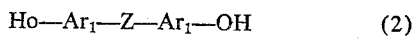

where X is halogen and where $Ar_2$ is a meta-phenylene group which also may be further substituted. These acid halides may be prepared from the corresponding dicarboxylic acid by any one of several well-known methods; the diacid chloride is usually preferred.

Preferred among the diacid chlorides are isophthaloyl chloride, 5-t-butyl-isophthaloyl chloride, 5-chloroisophthaloyl chloride. Other substituent groupings may be present on the aromatic ring. Mixtures of isophthaloyl and terephthaloyl chlorides, consisting of at least 10 and preferably more than 50% (mole basis) of the isophthaloyl species, may also be employed.

A further difunctional acid halide which may be utilized has the structure:

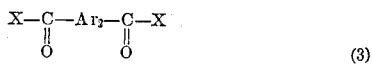

wherein X is halogen, preferably chlorine; the latter diacid chloride can be prepared by condensing hexafluoroacetone and toluene in the presence of anhydrous hydrogen fluoride in a bomb at about 140° C. under autogeneous pressure, the resulting ditolylperfluoropropane being oxidized with potassium permanganate in aqueous pyridine, or with chromium trioxide in acetic acid, to 4,4'-(hexafluoroisopropylidene)dibenzoic acid from which the corresponding diacid chloride can be obtained by reaction with thionyl chloride in the presence of a dimethylformamide catalyst.

Preferred among the polyesters of this invention are the ones derived from isophthalic acid, 5-t-butyl-isophthalic acid, 4,4'-(hexafluoroisopropylidene)diphenol, and 4,4' - (sym-dichlorotetrafluoroisopropylidene)diphenol. The singularly preferred polyester is poly[(hexafluoroisopropylidene)di-p-phenylene isophthalate] which has the recurring structural unit:

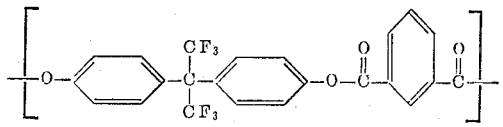

The polymers of this invention may be cast into films or dry-spun into filamentary forms from solutions containing from about 15 to about 30% by weight of the polymer dissolved in a solvent selected from the class consisting of tetrahydrofuran, methyl ethyl ketone, chloroform, cyclohexanone, and a mixture of 4% 1,1,2-trichloroethane and 96% tetrahydrofuran. The solutions ordinarily have viscosities between about 10 and about 500 poises; they remain stable in storage at low temperatures for at least 24 hours without developing a substantial viscosity rise or noticeable cloudiness. Moreover, such solutions are notably free from filterable materials, e.g., gelled polymer. This permits the preparation of films by casting or the preparation of filaments by wet or dry spinning, following which the articles can be crystallized, thereby developing the optimum in the way of ultimate physical properties.

It has been found that polymers of the Formula 1 above, wherein $Ar_2$ is a mixture of aromatic radicals containing more than 90% of para-phenylene radicals result in poor quality, brittle fibers of irregular diameter and in gelation in the spinning cell when the polymer is dry spun. Filaments may also be prepared by conventional melt spinning techniques.

Shaped articles prepared from the polymers of this invention exhibit excellent light stability. This property is evident in the behavior of films and yarns on prolonged exposure to an intense light source (e.g., after accelerated testing in a fadeometer, where the articles are subjected to strong visible and ultra-violet radiation), the filaments and yarns tested in this manner exhibiting tenacity halflives in excess of about 600 exposure hours. For the purpose of testing the light durability and discoloration of shaped articles comprising polymers of this invention, samples of fibers or films were exposed to the light from either xenon arc or a carbon arc in a Model FDA–R fadeometer manufactured by Atlas Electric Devices Co., Inc., Chicago, Ill. The apparatus was operated in accordance with the standard procedure for dyed textiles (ASTM designation D506–55) except that for some samples the instrument was modified by replacing the carbon arc with a xenon-filled lamp, and the samples were mounted in a different manner. The aforesaid xenonfilled lamp was an Osram XBF–6000 which is water cooled and has a minimum coolant flow of 6 l. per minute, an AC-current supply voltage of 220 volts, an operating voltage of 135 volts, an operating amperage of 45 amperes, and a rated power of 6000 watts. Films were stapled to the face of a piece of 91-pound white Bristol Index cardboard and a portion of each sample was covered by an additional strip of cardboard. Fibers were wound on the cardboard on the longer direction for physical testing, and in the short direction to form a single layered mat for color testing. The cardboard assembly was clipped at the top and bottom in the usual sample position of the instrument. Color changes were observed by comparing the exposed and unexposed areas in north sky light or equivalent light of about 50 foot candles or more on the surface. Observations were made as soon as the exposure period was completed.

The yarns of this invention also exhibit outstanding wash-wear potential, as indicated by wash-set recovery data and confirmed by actual fabric testing. The wash-set recovery has been found to correlate very well with the fabric wash-wear performance. The wash-set recovery test avoids the many uncertainties and ambiguities which stem from differences in fabric construction and the like. The test is simply applied: A sample of yarn is bent 360° around a 25-mil wire mandrel and placed under a load of 0.05 gram per denier. The yarn is soaked for 2 minutes in a 60° C. detergent solution, rinsed with clear room-temperature water, and then dried for a period of one to two hours at controlled conditions of temperature (21° C.) and relative humidity (15%). It is then removed from the mandrel and permitted to recover with no load under the same conditions of temperature and humidity. The wash-set recovery is reported as the angle through which the bent yarn recovers under the above conditions and is expressed in degrees, the maximum recovery possible being 360°.

The yarns of this invention exhibit wash-set recovery angles in excess of about 300°. Indeed, the wash-set recovery angle of the preferred poly[(hexafluoroisopropylidene)di-p-phenylene isophthalate] approaches 335°, an indication that recovery from hot-wet deformation is substantially complete. Commercially-available yarns of poly(ethylene terephthalate) and poly[trans-cyclohexane (1,4-dimethylene) terephthalate] exhibit wash-set recovery angles in the range of 200–240°, depending on their processing.

Finished textile articles prepared from the polymers of this invention possess marked antisoilability toward both oily and dry soiling, and exhibit a high degree of wash recovery from soiling. The excellence in these qualities is made evident by a comparison of the results of soiling tests performed on taffeta fabrics prepared from polymers of this invention with those obtained for certain commercially available poly(ethylene terephthalate) shirting fabrics, as shown in Example XXXVI.

The following nonlimiting examples are illustrative of the practice of preferred embodiments of the invention. In these examples, parts and percentages are expressed on a weight basis unless otherwise indicated, and inherent viscosities ($\eta_{inh}$) have been determined in accordance with the following equation:

$$\eta_{inh} = \frac{\ln \eta_{rel}}{c}$$

The relative viscosity ($\eta_{rel}$) may be determined by dividing the flow time in a capillary viscometer of a dilute solution of the polymer by the flow time for the pure solvent. The concentration (c) used in the examples is 0.5 gram of polymer per 100 ml. of solution, and the measurements are made at 30° C. Unless otherwise specified, inherent viscosities are measured in a mixed solvent comprising 40 parts by weight sym-tetrachloroethane and 60 parts by weight phenol. The polymers of the invention will have an inherent viscosity of at least 0.45 in such solvent mixture.

EXAMPLE I 4,4'-(hexafluorocyclobutylidene)diphenol

In a glass reactor of internal capacity corresponding to 125 ml. of water is charged 4.9 g. of perfluorocyclobutanone hydrate, 5.0 g. of phenol (2.24 molar proportions based on the hydrate), and 2.5 ml. of acetic acid. To the resultant mixture is added slowly with stirring 7.5 ml. (about 16 molar proportions based on the ketone hydrate) of 96% sulfuric acid over a period of about five minutes. The homogeneous reaction mixture becomes warm and turns slightly yellow during the addition. After letting stand for about five minutes, during which time the mixture is neither cooled nor heated externally, an excess of ice is added with agitation to dilute the mixture and to absorb the heat dilution. When the ice has melted, the aqueous mixture contains a crystalline solid which is filtered, washed, and air-dried. There is thus obtained 3.1 g. (35.6% of theory) of crude 4,4'-(hexafluorocyclobutylidene)diphenol as white crystals melting at 161–163° C. The product is soluble in diethyl ether, acetone, or dilute aqueous sodium hydroxide and slightly soluble in methylene chloride. The crude product is dissolved in aqueous 5% sodium hydroxide, the solution filtered to remove insoluble impurities, and the product is reprecipitated by acidification of the filtrate with dilute hydrochloric acid. After filtering, washing, and drying, the purified 4,4'-(hexafluorocyclobutylidene)diphenol is obtained as white crystals melting at 164.5–166.0° C.

Analysis.—Calcd. for $C_{16}H_{10}O_2F_6$: F, 32.8%. Found: F, 32.0%.

EXAMPLE II

Poly[(hexafluorocyclobutylidene)di-p-phenylene isophthalate]

A solution consisting of 3.48 g. (0.01 mole) of 4,4'-(hexafluorocyclobutylidene)diphenol, 160 ml. of water, 40 ml. of 0.5097 N sodium hydroxide, and 0.8 g. of sodium lauryl sulfate is placed in a Waring Blendor. While rapidly stirring the solution, a second solution comprising 2.03 g. (0.01 mole) of freshly crystallized isophthaloyl chloride in 110 ml. of methylene chloride is added in a thin stream, and the two-phase system is rapidly stirred for a period of fifteen minutes. The resulting emulsion is diluted with acetone to precipitate the polymeric product. The coagulated polymer is separated by filtration and washed thoroughly with water and with acetone, and is dried in a vacuum oven at 50° C.; $\eta_{inh}=0.72$.

EXAMPLE III 4,4'-(dichlorotetrafluoroisopropylidene)diphenol

In a Hastelloy bomb are combined 119.37 g. of sym-dichlorotetrafluoroacetone, 112.93 g. of phenol, and 199 g. of anhydrous hydrogen fluoride. The mixture is heated for 10 hours at 100° C. The dark brown crude product is poured onto ice water and neutralized with sodium bicarbonate. The solid is filtered, washed with water, and subjected to steam distillation. Two products are obtained: A—Steam-distillable, white needles (5.8 g.) melting at 132.5–133° C. B—Nonsteam-distillable, light yellow solid (148 g.) melting at 189–190° C. B is recrystallized first from toluene and then from glacial acetic acid. Final M.P. 196–196.8° C. Product A is p-hydroxy α,α-bis(difluorochloromethyl) benzyl alcohol. Product B is 4,4'-(dichlorotetrafluoroisopropylidene)diphenol.

EXAMPLE IV 4,4'-(1,1,1-trifluoroethylidene)diphenol

In a Hastelloy bomb are combined 29 g. (0.25 mol) of trifluoroacetaldehyde hydrate, 47.3 g. phenol, and 83 g. anhydrous hydrogen fluoride. The mixture is heated at 50° C. for 8 hours. The hydrogen fluoride is vented and the residue is distilled under reduced pressure. The fraction distilling at 165–170° C./0.5–0.6 mm. is the desired product. Yield is 40%.

Analysis.—Calcd. for $C_{14}H_{13}F_3O_2$: C, 62.69%; H, 4.13%; F, 21.25%. Found: C, 62.31%; H, 4.23; F, 20.93%.

EXAMPLE V 4,4'-(hexafluoroisopropylidene)bis(2,6-dichlorophenol)

4,4'-(hexafluoroisopropylidene)diphenol is obtained by the method of Knunyants et al., Bull. Acad. Sci. U.S.S.R., Div. of Chem Sci, 1960, 647–653

In a round bottom flask 100 g. of 4,4'-(hexafluoroisopropylidene)diphenol is dissolved in 1 l. of glacial acetic acid and cooled to 0° C. Sixty ml. of chlorine, as gas, is conducted into the flask. The completed reaction mixture is poured into water and the resulting precipitate is filtered and washed with water. The crude product (141 g.) is purified by salt formation and recrystallization from acetic acid and ethylenedichloride, M.P. 229–229.8° C.

Analysis.—Calcd. for $C_{15}H_6Cl_4F_6O_2$: Cl, 29.9%. Found: Cl, 30.2%.

EXAMPLE VI

4,4'-(hexafluoroisopropylidene)ditoluene

To a clean, dry Hastelloy C bomb having a capacity of 400 ml. are charged 64 g. toluene, the bomb is then cooled to −70° C. in a Dry Ice-acetone bath, and evacuated. Into the bomb are condensed 165 g. anhydrous hydrogen fluoride, followed by 66 g. hexafluoroacetone. The bomb is then sealed and heated under autogenous pressure to 160° C. for 14 hours. After cooling to 0° C. the bomb is vented, opened and the contents discharged onto 500 g. ice in a stainless steel beaker. The upper layer of aqueous hydrogen fluoride is cautiously decanted from the crude product which is then washed several times with water by decantation. The product is dissolved in petroleum ether (30–60° C. B.P.) and washed once with 100 g. 6% aqueous caustic soda. The petroleum solution is dried and distilled to yield 98 g. product B.P. 110–112°/1.7 mm. The product solidifies and can be recrystallized from petroleum ether to a M.P. 80–81° C.

*Analysis.*—Calcd. for $C_{17}H_{14}F_6$: C, 61.4; H, 4.2; F, 34.3. Found: C, 61.4; H, 4.4; F, 34.2.

EXAMPLE VII

4,4'-(hexafluoroisopropylidene)dibenzoic acid 225 g. of the ditoluene compound prepared as described in Example VI are dissolved in 2 liters acetic acid and heated to 80° C. To the solution at 80° C. are added, very cautiously, 500 g. chromium trioxide in portions of 20 g. over 5 hours. After stirring at 80–90° C. overnight, the solution is heated to reflux 2 hours. The acetic acid is stripped off under vacuum until the mixture gets very thick; 1,000 g. of water are added and the solution steam distilled to remove as much of the acetic acid as practical. On cooling, the mixture is filtered and the cake washed with water; retaining the filtrate (A). The filter cake contains most of the product which is dissolved by heating with sodium carbonate solution, then filtered with Filter-cel (trademark for Johns-Manville Co.'s diatomaceous silica) and acidified with sulfuric acid to precipitate the dibenzoic acid which is filtered and washed acid free with water, then dried to give 197 g. product M.P. 269° C. Further product can be obtained from the filtrate (A) by adding sodium carbonate solution to pH 10, filtering and acidifying the filtrate. A slight greenish tint due to residual traces of chromium salts can be removed by conversion to the diacid chloride.

To a slurry of 50 g. of the dibenzoic acid in 205 g. of thionyl chloride are added 2 drops of dimethyl formamide. Hydrogen chloride is evolved quite slowly; after heating at reflux overnight, as much as possible of the thionyl chloride is stripped off; 200 ml. toluene are added and distillation continued till all of the residual thionyl chloride has gone. The solution is filtered from any sediment of chromium salts and distilled through a spinning band column to give 4,4'-(hexafluoroisopropylidene)dibenzoyl chloride B.P. 135–140° C./0.5 mm. which is recrystallized from ligroin to yield 45 g., M.P. 98–99° C. The acid chloride may be hydrolyzed by refluxing 2 parts of it in 50 g. methanol containing 5 g. sodium hydroxide for 2 hours; the solution is diluted with 250 g. of water and acidified with dilute hydrochloric acid to give 1.8 g. of the diacid M.P. 269° C.

*Analysis.*—Calcd. for $C_{17}H_{10}F_6O_4$: C, 52.0; H, 2.6; F, 29.1. Found: C, 52.0; H, 2.6; F, 29.1.

EXAMPLE VIII

Poly[hexafluoroisopropylidene)di-p-phenylene isophthalate]

(a) A cold solution consisting of 4.203 g. (0.0162 mole) of 4,4'-(hexafluoroisopropylidene)diphenol, 110 ml. of water, 4.86 ml. of a 5.15 N sodium hydroxide solution and 10 ml. of 10% aqueous "Duponol" ME (the registered trademark for a dry surface active agent comprising technical sodium lauryl sulfate) is placed in a Waring Blendor. While rapidly stirring the solution, a second cold solution comprising 2.538 g. (0.0125 mole) of isophthaloyl chloride in 30 ml. of 1,2-di-chloroethane is added, and the two-phase system is rapidly stirred for a period of five minutes. The resulting emulsion is poured into acetone to precipitate the polymeric product, which is separated by filtration. The polymer is washed with 1/1 alcohol/water mixture and with water, and dried in a vacuum oven at 80° C. The yield is 94% $\eta_{inh}=1.52$.

(b) Poly[(hexafluoroisopropylidene)bis(2,6 - dimethyl-p-phenylene) isophthalate] was prepared in an analogous manner from 4,4' - (hexafluoroisopropylidene)bis-(2,6-dimethyl phenol) and isophthaloyl chloride. The yield of polymer having a melting point of 280° C. was 96.5% and the $\eta_{inh}$ (TCE/phenol) was 0.46.

EXAMPLE IX

Poly[(hexafluoroisopropylidene)bis(2,6-dichloro-p-phenylene)isophthalate]

In a blender is placed a solution consisting of 5.925 g. of 4,4' - (hexafluoroisopropylidene)bis(2,6-dichlorophenol), 1.0 g. of sodium hydroxide, 115 ml. of water, 10 ml. of 10% "Duponol" ME solution, and 1.0 g. tetraethylammonium chloride. Isophthaloyl chloride (2.538 g.) in 30 ml. of 1,2-dichloroethane is added to the rapidly stirred solution. After 5 min. the polymer is precipitated with acetone and washed with 1/1 alcohol/water and with water. The yield is 91% and $\eta_{inh}$ is 1.70 (CHCl₃).

EXAMPLE X

Poly[(hexafluoroisopropylidene)di-p-phenylene isophthalate/(isopropylidene)bis(2,6 - dichloro - p-phenylene) isophthalate]

A solution of 18.913 g. of 4,4'-hexafluoroisopropylidene) diphenol, 2.288 g. of 4,4'-isopropylidenebis(2,6-dichlorophenol) 5.001 g. of sodium hydroxide, 50 ml. of 10% "Duponol" ME 575 ml. of water, and 5.0 g. of tetraethylammonium chloride is placed in a blender. While the former is being rapidly stirred 12,690 g. of isophthaloyl chloride in 150 ml. of 1,2-dichloroethane are added. The solution is stirred for 5 min. The polymer is precipitated with acetone and washed with 1/1 alcohol/water and with water. The yield is 97.5% and $\eta_{inh}$ is 1.12.

Various properties of polymers prepared in accordance with the procedures of the preceding examples are summarized in Table I, together with the corresponding properties of numerous other polymers prepared in a similar manner. Each of the polymers is prepared according to the general procedure of Example IX, with the exception of Examples XVI and XXVII which are prepared by the methods of Examples VIII and II, respectively. Each of the polymers consists of recurring units of the formula hereinabove specified, and reproduced here for easy reference, the designation of Z being shown for each example, the designation of $Ar_1$ representing unsubstituted p-phenylene except for Example XXVII (the product of Example IX) and the designation of $Ar_2$ denoted by the name of the acid from which it is derived:

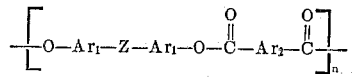

PMT refers to the polymer melt temperature and the column entitled "Film" describes the solvent from which films are prepared (by the code letters corresponding to the legend at the bottom of the table). The fadeometer measurement is a determination of the number of hours of exposure necessary to cause a "color break" (defined as the time at which the first visible indication of the colored product of degradation appears; the light source is identified by a code letter in the legend) when the films are tested. The fiber section of the table indicates the solvent medium from which the fibers are prepared (code letters explained in the legend), a summary of drawing conditions, values (at 21° C., 65% relative humidity) for the tenacity, elongation, and modulus determination, the wash-set recovery angle, and the yarn size in denier per filament.

As will be seen from the following, the polymers of the invention are highly resistant to discoloration on exposure to light being able to withstand an exposure to the xenon fadometer of at least 100 hours and preferably at least 300 hours without a color break.

placed 21.015 g. of 4,4'-(hexafluoroisopropylidene)diphenol, 0.125 g. of tetraethylammonium chloride, and 125 ml. of ortho-dichlorobenzene. Heating of these materials is undertaken and when a temperature of 150° C. is reached, 12.69 g. of isophthaloyl chloride is added in 100 ml. of ortho-dichlorobenzene. The solution is stirred for 12 hours at 200–225° C. while maintaining a good flow of nitrogen; during this time the ortho-dichlorobenzene is occasionally replenished. The polymer is then precipitated by the addition of hexane and is washed with hexane, 1/1-

TABLE I

| Example | Z | Acid Chloride | $\eta_{inh}$ | Percent Yield | Film | Hrs., Fade-ometer | PMT,° C. |
|---|---|---|---|---|---|---|---|
| XI | —CH$_2$— | Isophthalic | | | | <10[1] | |
| XII | —Bond— | do | | | | <2[1] | |
| XIII | —C(CH$_3$)$_2$— | do | | | | <5[1] | |
| XIV | —C(CH$_3$)(C$_2$H$_5$)— | do | | | | <5[1] | |
| XV | —C(CF$_3$)H— | do | 0.97 | 91 | A | 100[2] | 290 |
| XVI | —C(CF$_3$)$_2$— | do | 1.52 | 94 | A | >600[2] | 364 |
| XVII | —C(CF$_3$)$_2$— | {70% Isophthalic / 30% Terephthalic} | 1.25 | 94 | A | >500[2] | 328 |
| XVIII | —C(CF$_3$)$_2$— | {10% Isophthalic / 90% Terephthalic} | 1.62 | 98 | A | 100[2] | >400 |
| XIX | —C(CF$_3$)$_2$— | {20% Isophthalic / 80% Terephthalic} | 1.67 | 99.5 | A | 200[2] | >370 |
| XX | —C(CF$_3$)$_2$— | {30% Isophthalic / 70% Terephthalic} | 1.78 | 98 | A | 300[2] | >370 |
| XXI | —C(CF$_3$)$_2$— | {50% Isophthalic / 50% Terephthalic} | 1.57 | 98 | A | 400[2] | >370 |
| XXII | —C(CF$_3$)$_2$— | {80% Isophthalic / 20% Terephthalic} | 1.19 | 94 | AL | >600[2] | >370 |
| XXIII | —C(CF$_3$)$_2$— | {5% Isophthalic / 95% Terephthalic} | 1.83 | 96 | A | 75[2] | >400 |
| XXIV | —C(CF$_3$)$_2$— | {2% Isophthalic / 98% Terephthalic} | 1.06 | 95 | A | 25[2] | >400 |
| XXV | —C(CF$_3$)$_2$— | Terephthalic | 1.01D | 94 | A | 75[2] | >400 |
| XXVI | —C(CF$_3$)$_2$— | 5-tert-butylisophthalic | 1.07 | 96 | A | >600[2] | 340 |
| XXVII | —C(CF$_3$)$_2$— | 5-chloroisophthalic | 0.88 | 96 | A | 300[2] | 352 |
| XXVIII | —C(CF$_3$)$_2$— | 4,4'-hexafluoroisopropylidenedibenzoic | 1.05 | 98 | A | >300[2] | >380 |
| XXIX | —C(CF$_2$Cl)$_2$— | Isophthalic | 1.34 | 96 | B | >600[2] | >400 |
| XXX | —C(CF$_2$Cl)$_2$— | 5-tert-butylisophthalic | 2.48 | 96 | | | >400 |
| XXXI | —C—[(CF$_2$)$_3$]— | Isophthalic | 0.72 | | C | 850[1] | >400 |
| XXXII | —C—(CF$_3$)$_2$ | Isophthalic | 0.89 | 91 | A | >300[2] | 390 |
| XXXIII | —C(CCl$_3$)H— | 5-tert-butylisophthalic | | | | 50[2] | |

| Example | Solvent (Percent Solids) | Drawing | Fiber | | | | |
|---|---|---|---|---|---|---|---|
| | | | T | E | Mi | WSRA | d.p.f. |
| II | 80F/20D (20%) | 2X; 105° C. Pin | 1.62 | 39 | 18 | 315° | |
| VIII(a) | A (25%) | 2.85X; 185° C. Pin | 1.69 | 27 | 26 | 335° | 4.56 |
| VIII(a) | B (15%) | 2.5X; 215° C. Pin | 2.42 | 50 | 21 | 335° | 3.49 |
| IX | A (23%) | 1.8X; 215° C. Pin | 1.39 | 31 | 24 | 310° | 6.56 |
| X | A (22%) | 2.3X; 210° C. Pin | 1.71 | 36 | 23 | 320° | 6.37 |
| XV | E (23%) | 2.4X; 175° C. Pin | 2.65 | 38 | 27 | 330° | 2.79 |
| XVIII | A (19%) | 1.6X; 210° C. Pin | 1.68 | 37 | 20 | | 7.15 |
| XXVIII | E (20%) | 2.0X; 25° C. | 1.69 | 26 | 24 | 320° | 4.79 |
| XXIX | A (26.5%) | 2.2X; 200–205° C. Pin | 1.71 | 55 | 18 | 310° | 5.35 |

Legend:
[1] = Carbon arc light source.
[2] = Xenon lamp light source.
A = tetrahydrofuran.
B = chloroform.
C = tetrachloroethylene.
D = trifluoroacetic acid.
E = cyclohexanone.
F = 1,1,2-trichloroethane.

EXAMPLE XXXIV

Poly[(hexafluoroisopropylidene)di - p - phenylene isophthalate] having an inherent viscosity of 1.2 is dissolved in tetrahydrofuran to produce a solution containing 25% solids. The solution is maintained at a temperature of 35° C. and is extruded through a spinneret having 3 holes of 0.005 inch diameter and which is at a temperature of 35° C. A drying column, having a temperature of 60° C. at the top and 70° C. at the bottom, permits evaporation of the spinning solvent. The filamentary product is extracted with a mixture of equal volumes of water and acetone to remove the residual spinning solvent. Fibers of the same polymer may be easily melt-spun from a press spinner at 312° C.

EXAMPLE XXXV

Into a 500-ml. round bottom flask equipped with a stirrer, condenser, and nitrogen inlet and outlet tubes are alcohol/water, and water. The product is dried in a vacuum oven at 80° C. The yield is 100% and $\eta_{inh}$ is 1.44.

EXAMPLE XXXVI

This example demonstrates the enhanced antisoil-ability properties possessed by fabrics prepared from polymers described in previous examples. The aforesaid antisoiling properties are determined by the testing procedures disclosed in U.S. Patent No. 2,939,202, employing the dry and oily soil mixtures described therein. Utilized in these tests are taffeta fabric prepared from yarns comprising polymers of the present invention, and ribbed Cavalcade shirting fabric containing poly(ethylene terephthalate) (catalog style 703, Test Fabrics Inc., 55 Vandam St., New York, N.Y.). Identity of these fabrics in the column entitled "Sample" in Table II can be determined by referring to the code designations and the legend.

TABLE II

| Sample | Oily Soil Test | | Dry Soil Test | |
|---|---|---|---|---|
| | Soil, Percent | Wash Percent | Soil, Percent | Wash, Percent |
| B | 40 | 72 | 22 | 62 |
| A-1 | 56 | 78 | 29 | 79 |
| B | 39 | 67 | 21 | 66 |
| A-2 | 49 | 88 | 23 | 73 |
| B | 47 | 82 | 22 | 60 |
| A-3 | 72 | 92 | 31 | 81 |

Legend:
A-1=Taffeta fabric from a polymer prepared according to Example VIII(a) herein.
A-2=Taffeta fabric from a polymer prepared according to Example XXVIII herein.
A-3=Taffeta fabric from a polymer prepared according to Example XXIX herein.
B=Cavalcade shirting containing poly(ethylene terephthalate).

What is claimed is:
1. A high molecular weight, polymeric, aromatic polyester consisting essentially of the following repeating unit

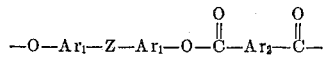

wherein $Ar_1$ is para-phenylene which may be substituted with a member of the group consisting of halogen and monovalent lower alkyl radicals; $Ar_2$ is selected from the group consisting of (1) meta-phenylene wherein the said phenylene radicals of (1) may bear substituents selected from the group consisting of halogen and monovalent lower alkyl and (2)

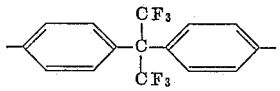

and Z is a divalent radical having the formula

wherein R and R' represent perfluoro- or perfluorochloroloweralkyl groups with the proviso that R' may represent hydrogen when R is perfluoroloweralkyl and R and R' may, together with the carbon atom to which they are attached, represent a perfluorinated cyclic hydrocarbon.

2. A high molecular weight, polymeric, aromatic polyester consisting essentially of repeating units, wherein each unit is of the formula:

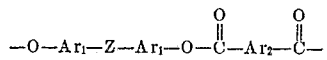

wherein $Ar_1$ is para-phenylene which may be substituted with a member of the group consisting of halogen and monovalent lower alkyl radicals; and wherein in each of the said units, $Ar_2$ is selected from the group consisting of (1) meta-phenylene and (2) para-phenylene and wherein the said phenylene radicals of (1) and (2) may bear substituents selected from the group consisting of halogen and monovalent lower alkyl; and Z is a divalent radical having the formula

wherein R and R' represent perfluoro- or perfluorochloroloweralkyl groups with the proviso that R' may represent hydrogen when R is perfluoroloweralkyl and R and R' may, together with the carbon atom to which they are attached, represent a perfluorinated cyclic hydrocarbon, with the proviso that in at least 10% of the said units $Ar_2$ is meta-phenylene.

3. Polymeric poly[(hexafluoroisopropylidene) di-p-phenylene isophthalate].

4. Polymeric poly[(hexafluorocyclobutylidene) di-p-phenylene isophthalate].

5. Polymeric poly[(hexafluoroisopropylidene) bis(2,6-dichloro-p-phenylene) isophthalate].

6. Polymeric poly[(hexafluoroisopropylidene) di-p-phenylene isophthalate/(isopropylidene) bis(2,6-dichloro-p-phenylene) isophthalate].

7. The polyester of claim 1 wherein $Ar_1$ is paraphenylene, $Ar_2$ is meta-phenylene and Z is

wherein R and R' are perfluoroloweralkyl.

References Cited

UNITED STATES PATENTS

| 3,028,364 | 4/1962 | Conix | 260—47 |
| 3,162,615 | 12/1964 | Bremmer | 260—47 |
| 3,248,366 | 4/1966 | Schmitt et al. | 260—47 X |

FOREIGN PATENTS

| 132,403 | 1960 | U.S.S.R. |

WILLIAM H. SHORT, *Primary Examiner.*

LOUISE P. QUAST, *Assistant Examiner.*